(12) United States Patent
Lutz et al.

(10) Patent No.: US 10,150,897 B2
(45) Date of Patent: Dec. 11, 2018

(54) ADHESIVE COMPOSITIONS, MANUFACTURE AND USE THEREOF

(71) Applicant: Dow Global Technologies LLC, Midland, MI (US)

(72) Inventors: Andreas Lutz, Galgenen (CH); Christof Braendli, Zurich (CH); Cathy Grossnickel, Wolfhausen (CH)

(73) Assignee: Dow Global Technologies LLC, Midland, MI (US)

( * ) Notice: Subject to any disclaimer, the term of this patent is extended or adjusted under 35 U.S.C. 154(b) by 291 days.

(21) Appl. No.: 14/781,349

(22) PCT Filed: Apr. 7, 2014

(86) PCT No.: PCT/US2014/033124
§ 371 (c)(1),
(2) Date: Sep. 30, 2015

(87) PCT Pub. No.: WO2014/172128
PCT Pub. Date: Oct. 23, 2014

(65) Prior Publication Data
US 2017/0081571 A1    Mar. 23, 2017

Related U.S. Application Data

(60) Provisional application No. 61/813,680, filed on Apr. 19, 2013.

(51) Int. Cl.
| | | |
|---|---|---|
| *C08L 63/00* | (2006.01) |
| *C09J 163/00* | (2006.01) |
| *C08L 9/00* | (2006.01) |
| *C09D 109/00* | (2006.01) |
| *C08L 13/00* | (2006.01) |
| *C09J 113/00* | (2006.01) |
| *C09J 109/02* | (2006.01) |
| *C09J 113/02* | (2006.01) |
| *C09J 109/00* | (2006.01) |
| *C08L 13/02* | (2006.01) |
| *C08L 9/02* | (2006.01) |

(52) U.S. Cl.
CPC ............... *C09J 163/00* (2013.01); *C08L 9/00* (2013.01); *C08L 9/02* (2013.01); *C08L 13/00* (2013.01); *C08L 13/02* (2013.01); *C08L 63/00* (2013.01); *C09J 109/00* (2013.01); *C09J 109/02* (2013.01); *C09J 113/00* (2013.01); *C09J 113/02* (2013.01); *C08L 2205/02* (2013.01)

(58) Field of Classification Search
CPC . C08L 63/00–63/10; C08L 9/02; C08L 13/00; C08L 13/02; C09D 163/00–163/10; C09D 109/02; C09D 113/00; C09D 113/02; C09J 163/00–163/10; C09J 109/02; C09J 113/00; C09J 113/02
See application file for complete search history.

(56) References Cited

U.S. PATENT DOCUMENTS

| | | | | |
|---|---|---|---|---|
| 5,292,812 | A * | 3/1994 | Yamazaki | C08G 59/4042 525/112 |
| 5,712,039 | A * | 1/1998 | Marhevka | C09J 163/00 427/207.1 |
| 9,034,135 | B2 | 5/2015 | Schulenburg et al. | |
| 2006/0089465 | A1* | 4/2006 | Kim | C08L 13/00 525/486 |
| 2006/0276601 | A1* | 12/2006 | Lutz | C08G 18/10 525/528 |

FOREIGN PATENT DOCUMENTS

| | | |
|---|---|---|
| EP | 1728825 A1 | 12/2006 |
| JP | 09194803 A * | 7/1997 |

OTHER PUBLICATIONS

Machine translation of JP-09194803-A.*
DIC Corporation, Epiclon Standard Products: Epoxy Resins and Curing Agents (Mar. 2013).*

* cited by examiner

*Primary Examiner* — Kregg T Brooks

(57) ABSTRACT

The invention relates to an adhesive composition having an added component of rubber-epoxy such as XNBR-epoxy adducts. It was found that the new adhesive composition significantly reduces meander formation in the making of automotive parts.

13 Claims, 8 Drawing Sheets

ADHESIVE COMPOSITIONS, MANUFACTURE AND USE THEREOF

FIELD OF THE INVENTION

Figure 1:
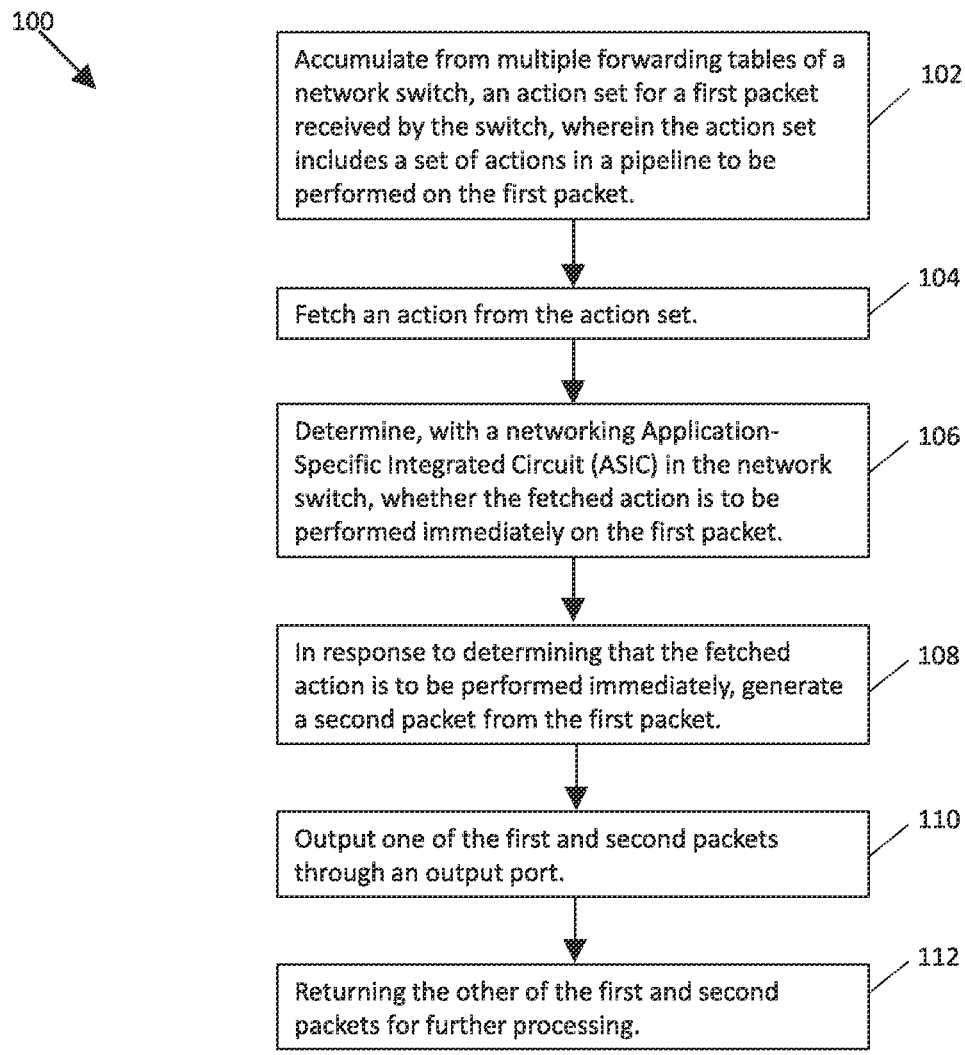
Figure 2:
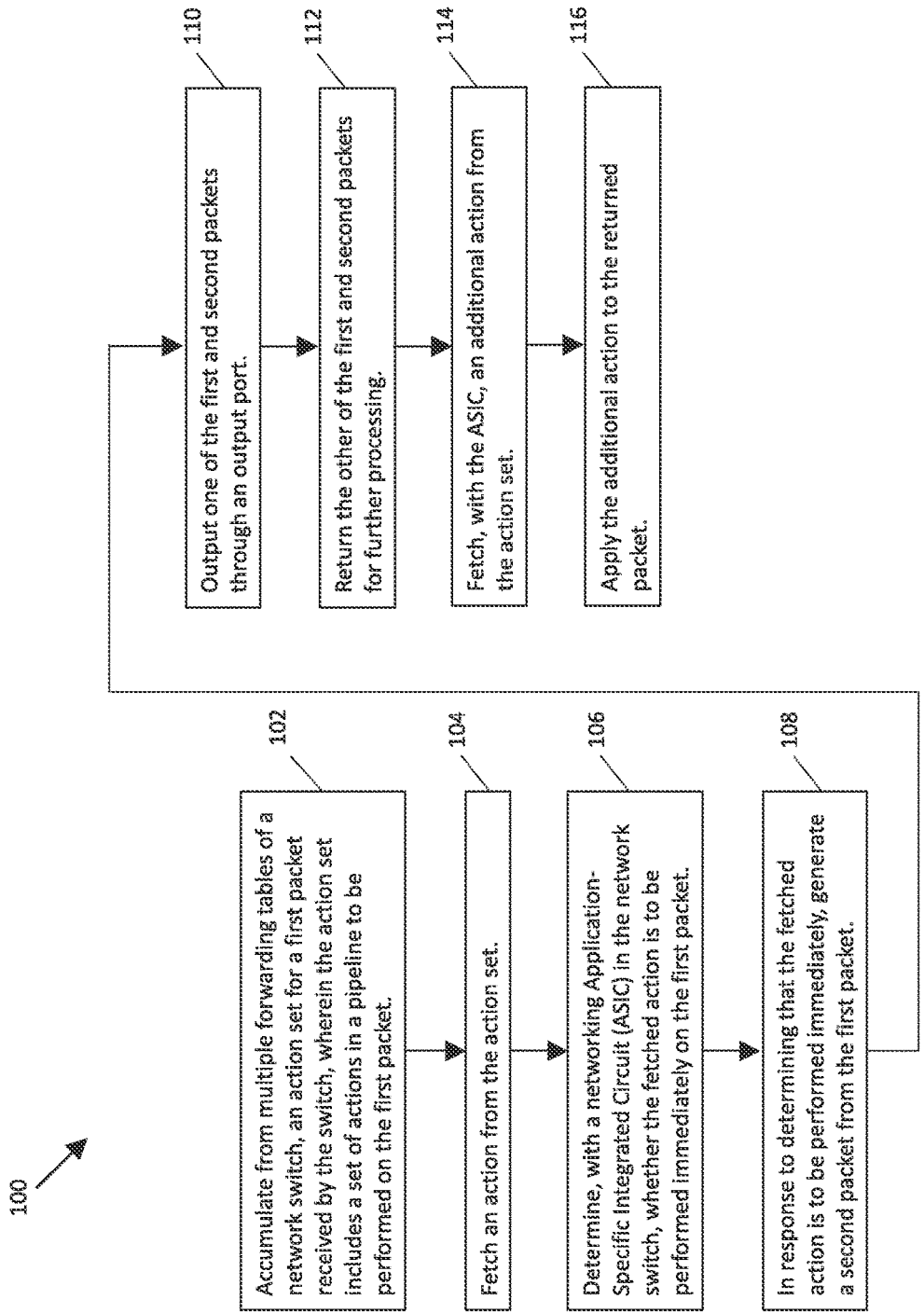
Figure 3:
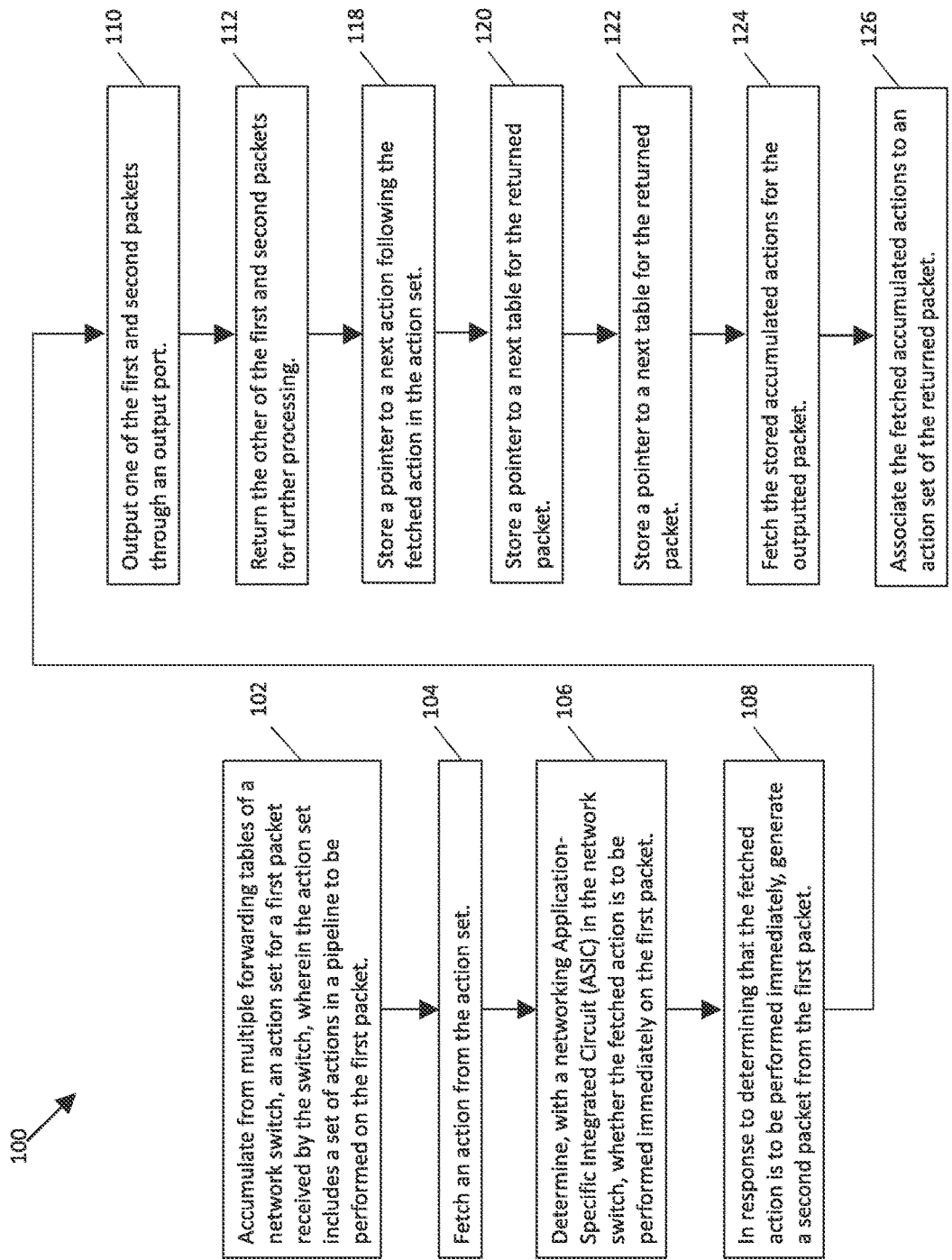
Figure 4:
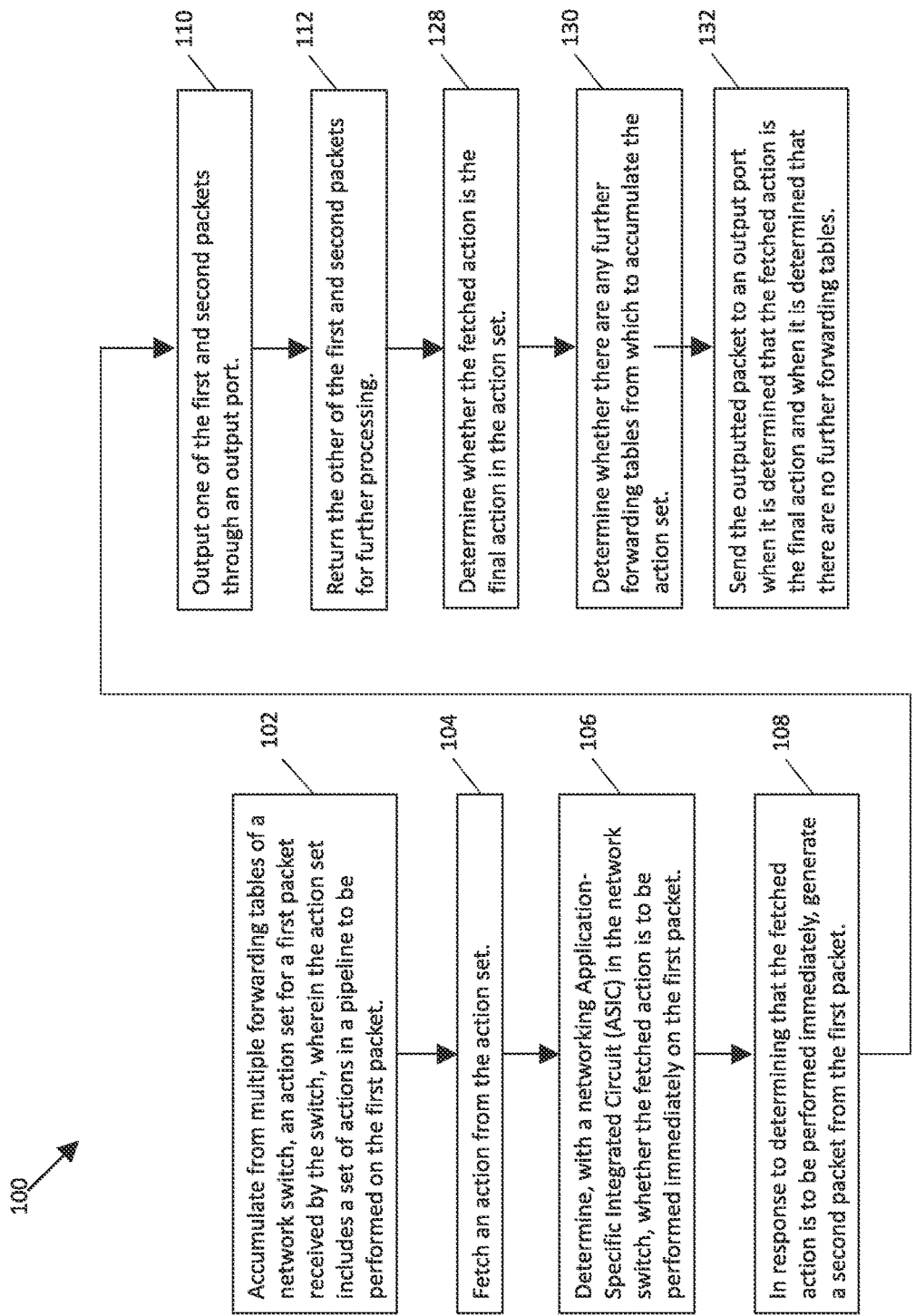
Figure 5:
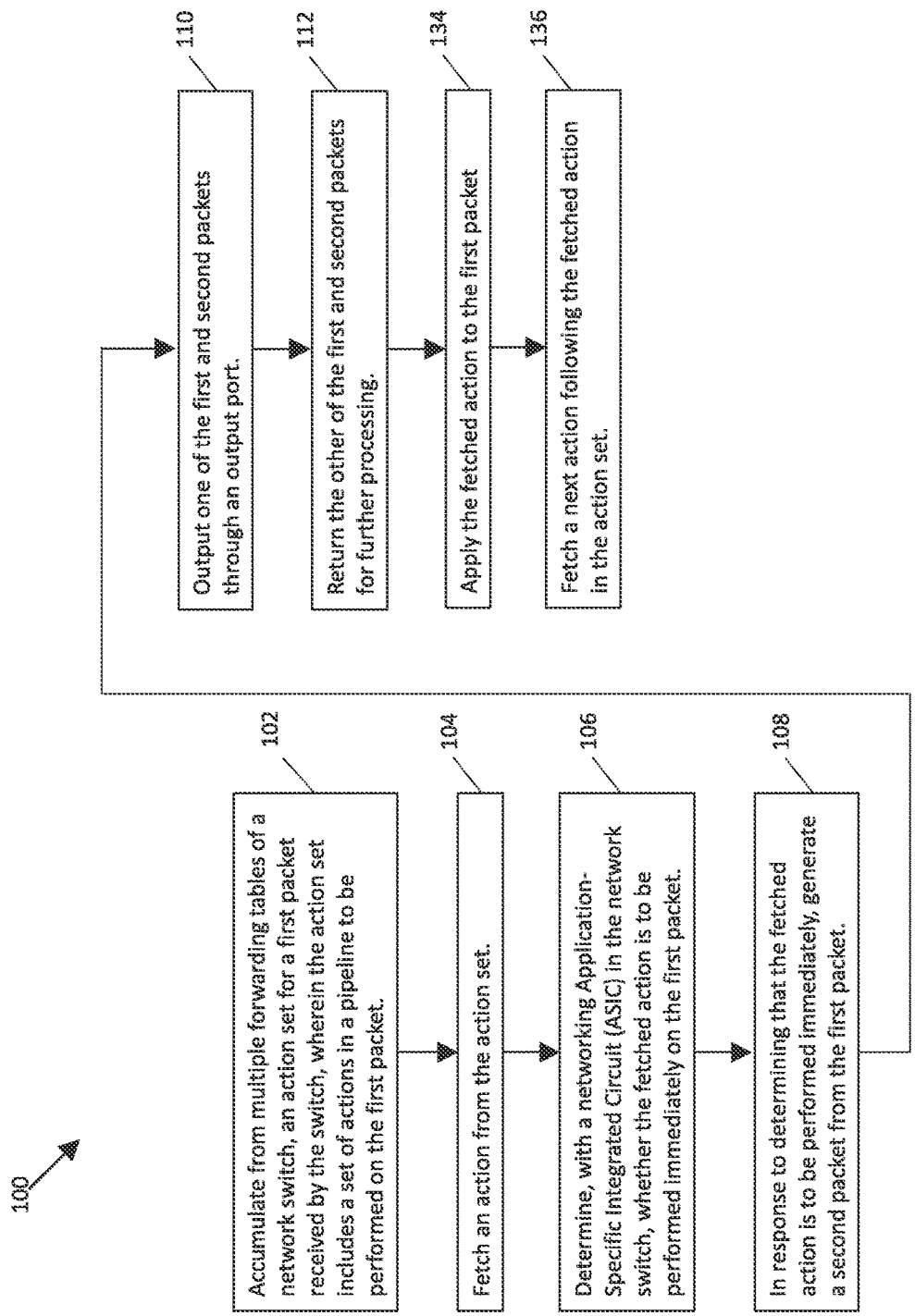
Figure 6:
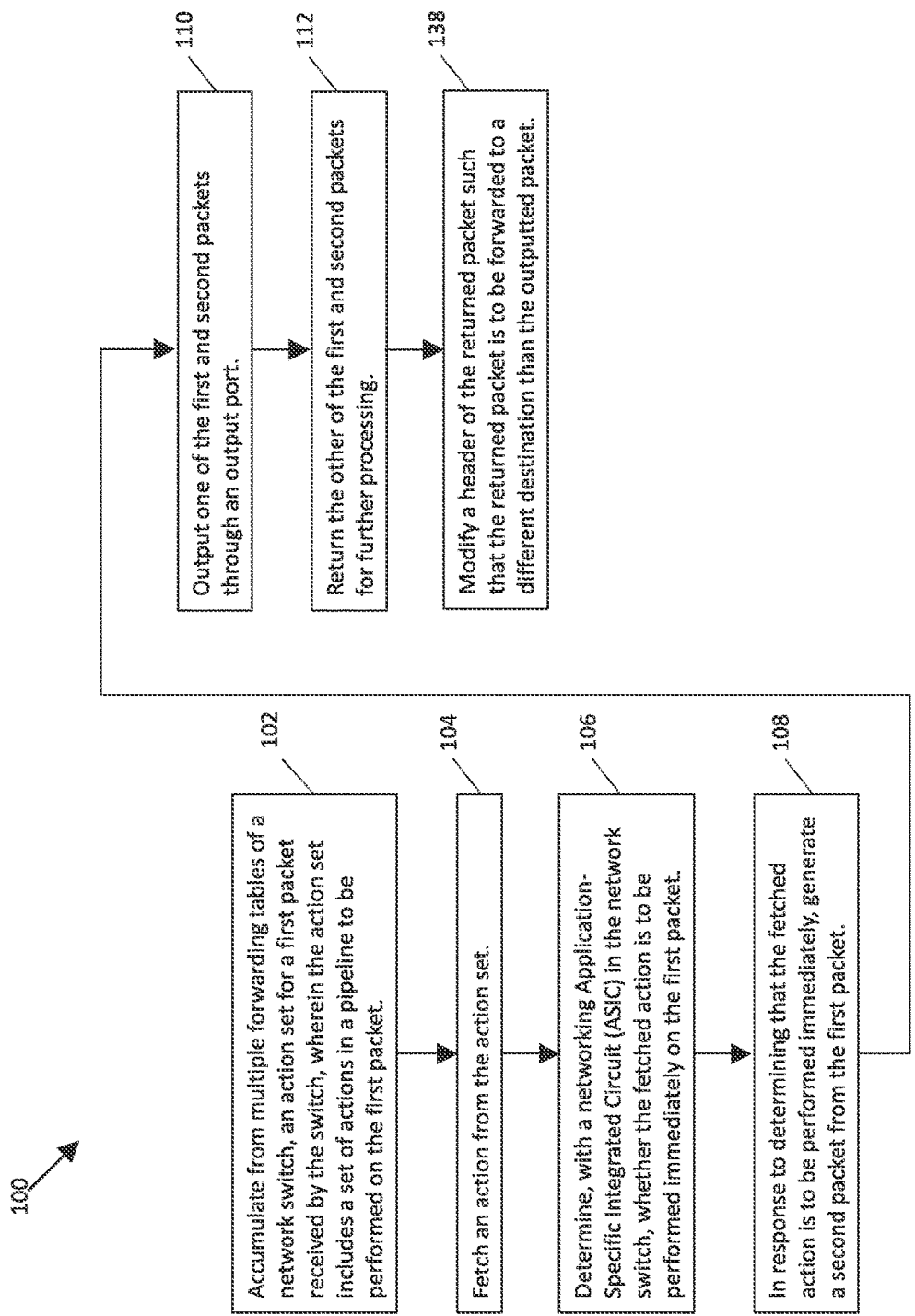
Figure 7:
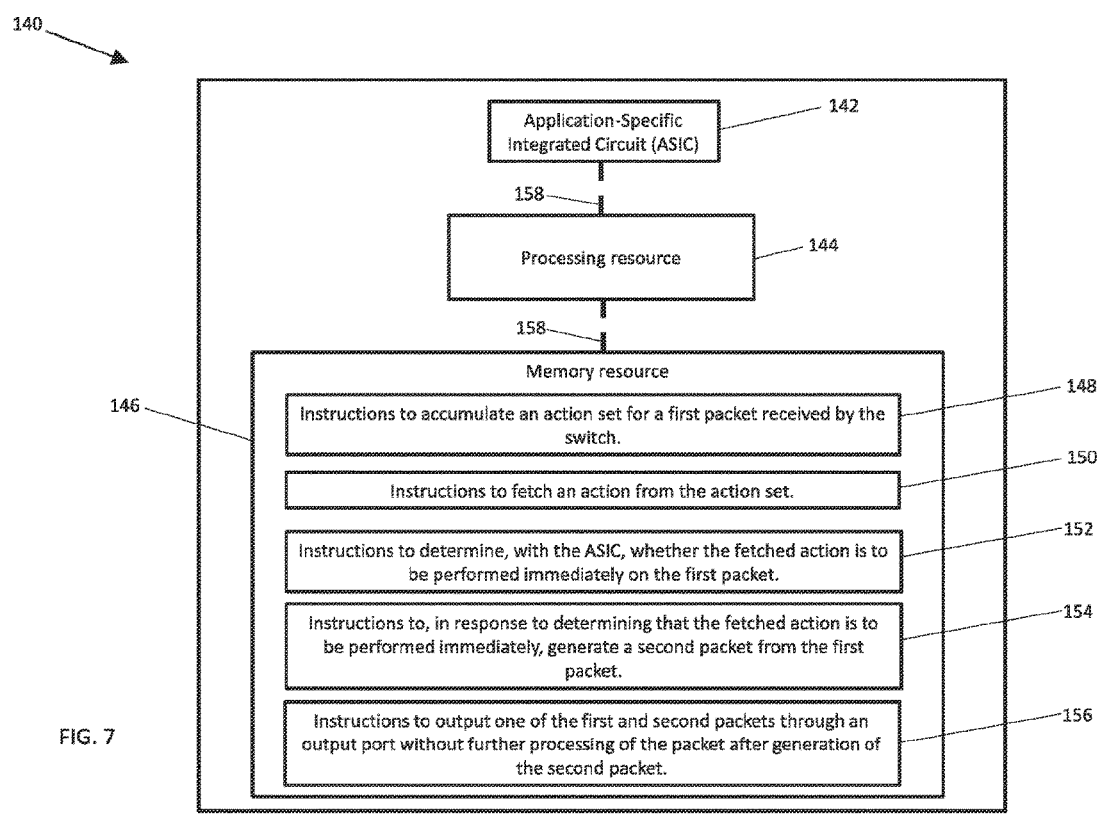
Figure 8:
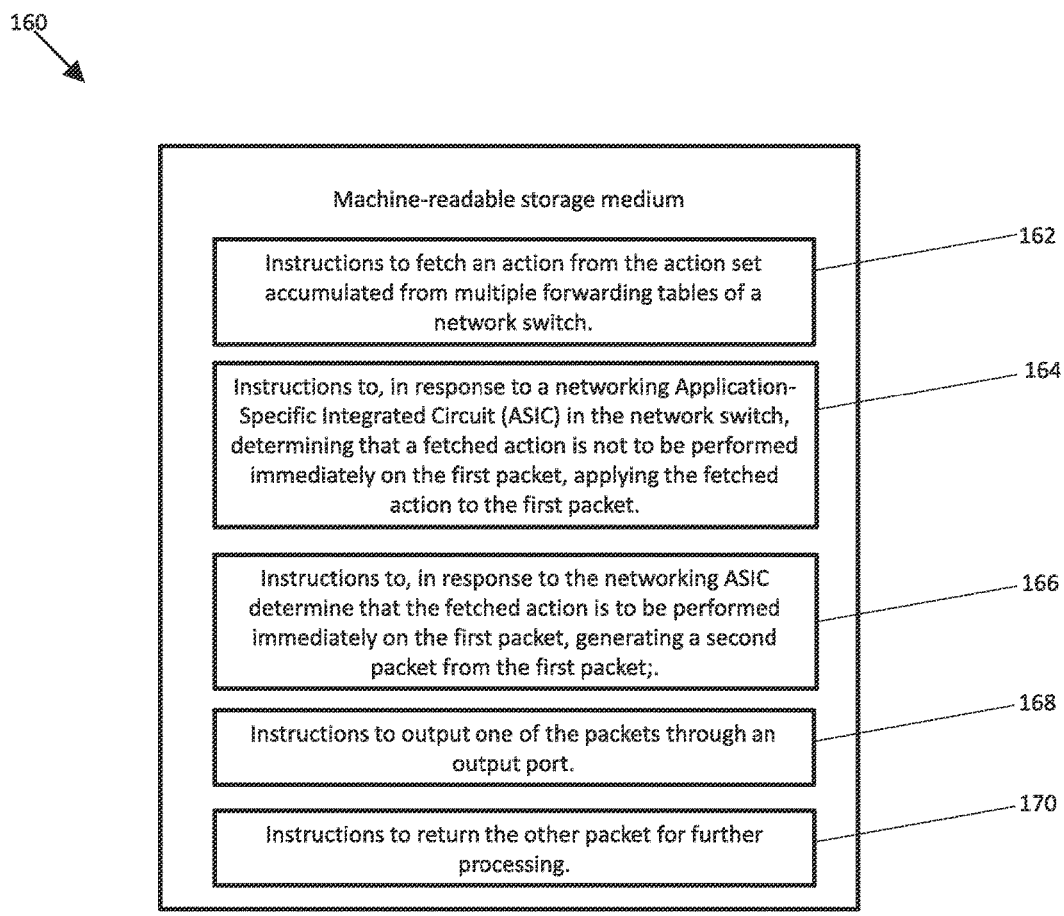

The present invention relates to a new adhesive composition having unique properties in some automotive related applications such as hem-flange bonding.

INTRODUCTION

Crash durable adhesives can be used in body structure of a car to offer improved crash resistance, fatigue durability, and increased body stiffness. They can also be used for hem-flange bonding in closures like hoods and doors. Hem-flange bonding is a process wherein an outer sheet metal is hemmed around an inner sheet metal to make a joint part for a car. Adhesives are used in this process between the two sheet metals. The detailed process of hem flange bonding has been described in U.S. Patent Application No. 20100266809.

During the hem flange bonding process, meander formation during curing of the adhesives, for example, crash durable adhesives, has been a challenging issue to the industry. The formed meander can lead to cracks in the joint. The resulted cracks can then lead to other more serious damages such as water intrusion into the joint which ultimately leads to corrosion issues over time.

SUMMARY OF THE INVENTION

The present invention provides a novel adhesive composition with excellent heat stability and improved tackiness. Use of the adhesive composition of the present invention significantly reduces meander formation in a joint part. Specifically, the present invention provides an adhesive composition that contains one or more rubber components, preferably, carboxylated acrylonitrile butadiene rubber-epoxy adducts ("XNBR-epoxy adducts). The present invention provides an adhesive composition by mixing XNBR-epoxy adducts with a typical, commercially available crash durable adhesive composition.

In one embodiment of the present invention, the adhesive composition comprises a liquid epoxy resin; a toughener; a curing agent; and a rubber-epoxy adduct component with a Mw valve above 60,000 Da.

In another embodiment of the present invention, the rubber-epoxy component of the present invention comprises carboxylated nitrile butadiene rubber-epoxy adducts.

In yet another embodiment of the present invention, the adhesive composition further comprises a solid epoxy resin.

DETAILED DESCRIPTION OF THE INVENTION

Many crash durable adhesive compositions are well known and commercially available. For example, EP1728825A1, incorporated herein in its entirety, describes many such adhesive compositions and with one or more toughening agents in the composition. A crash durable adhesive composition typically contains a liquid epoxy resin (for example, DER™ 330 or DER™ 331 available from The Dow Chemical Company), a solid epoxy resin (for example, DER™ 671 also available from The Dow Chemical Company), a blocked polyurethane based toughener (for example, polyphenolic blocked polyurethane "PU" as described in U.S. Pat. No. 5,278,257, incorporated herein in its entirety, and second-amine blocked PU as described in US 20060276601A1, incorporated herein in its entirety), a curing agent such as dicyandiamide, an accelerator (for example, polymeric blocked tert-amine as described in WO2012/006001A2, incorporated herein in its entirety). Such adhesive composition may also include other typically, well known in the industry, and routinely used components such as fillers, thixotropic agents, wetting agents, colorant adhesion promoters (for example, epoxy silanes), and/or special fillers such as metal to achieve conductivity.

The present invention includes a rubber component in a crash durable adhesive composition. It is suspected that meander formation and the resulted damages in the joint occur during the curing of the crash durable adhesives under heat. This may have been induced by thermal stresses in the joint due to different thermal expansion rates in multiple material structures. The present invention provides an adhesive composition with higher molecular weight XNBR-epoxy adducts so that the composition will have a rubbery nature. With the rubbery nature of the adhesive composition used, meander formation can be successfully avoided or significantly reduced, hence a significant better hem-flange bonding performance.

In a preferred embodiment of the present invention, rubber-epoxy adduct, such as liquid XNBR-epoxy adducts, is included in a crash durable adhesive composition to arrive at the new composition. For example, a rubber-epoxy adduct, such as a liquid XNBR-epoxy adduct, may be included in a typical crash durable adhesive composition. The new composition preferably contains about at least about 4 wt %, preferably at least about 8 wt % and more preferably at least about 12 wt %, of the rubber-epoxy adduct. Many such liquid XNBR-epoxy adducts may be used in the present invention. The rubber-epoxy adduct typically contains 1 to 15 wt %, preferably 3 to 10 wt %, of rubber elastomer and at least of about 1 wt %, preferably about 5 wt % of the higher molecular weight elastomers. The rubber elastomer can be either high molecular weight XNBR or a combination of high and lower molecular weight XNBR-rubbers (such as carboxylated acrylonitrile rubbers, CTBNs) at different ratios.

If only high molecular weight XNBR is used in the adduct, the amount of XNBR in the adduct should preferably be no more than 7 wt % based on the total weight of the adduct. If a combination of carboxyl-terminated liquid butadiene-acrylonitrile ("CTBN") rubber elastomers and XNBR rubber elastomers are used in the adduct, the total rubber amount in the adduct can be higher because of the lower viscosity of the CTBN rubber over the XNBR rubber. Typically, when a combination of different rubber-elastomers is used, the total rubber-elastomer amount in adduct can be less than 15 wt %, preferably, less than 10 wt % of the total weight of adduct. Above these levels, the adhesive viscosity will be too high to use in the desired applications.

The preferred rubber component of the liquid XNBR-epoxy adducts suitable for the present invention typically will have a high viscosity of above 50,000 mPa·s at 25° C., preferably above 300,000 mPa·s, and more preferably above or close to 500,000 mPa·s. While there is no particular preferred upper viscosity limit, as a practical matter, the person of ordinary skill in the art will recognize that viscosities less than about 600,000 mPa·s are preferred for processing reasons. Their molecular weight ("Mw") should be above 60000 Da, more preferably above 80,000 Da and most preferable above 100,000 and the Mn should be above 10000 Da, more preferably above 40,000 Da. While there is no preferred upper molecular weight, as a practical matter, the Mw will generally be less than about 200,000 Da.

The preferred liquid XNBR-epoxy adducts used in the present invention may include:

Nipol® DN 601, 1470, N34J or DN 631 available from Zeon Corporation;

Albipox® 8001 available from Evonik which is a composition comprising a liquid rubber modified epoxy resin based on Bisphenol-A-diglycidyl ether (DGEBA). Albipox® 8001 also contains a combination of XNBR and CTBN rubber at a weight ratio of about 7:1 and at a total amount of about 10 wt % based on the total weight of the composition of Albipox® 8001.

Struktol® 3691 available from Schill & Seilacher which is a nitrile rubber modified epoxy resin based on DGEBA. It contains about 5 wt % of XNBR rubber.

Struktol® 3693, also available from Schill & Seilacher which is a nitrile rubber modified epoxy resin based on Bisphenol-F-diglycidyl ether (DGEBF). It contains about 5 wt % of XNBR rubber.

Struktol® 3695, also available from Schill & Seilacher which is a nitrile rubber modified epoxy resin based on DGEBA. It contains a combination of XNBR and CTBN rubber of about 1:1 weight ratio at a total amount of about 10 wt % of the composition of Struktol® 3695.

Struktol® 3604 or 3614, both also available from Schill & Seilacher, which is a nitrile rubber modified epoxy resin based on DGEBA. Both contain about 40 wt % of XNBR. These two XNBR-modified epoxy resins have relatively low Mw and are used in this invention only in the comparative samples to illustrate the preferred ranges desired for the present invention.

Test Methods Used and Conditions for the Samples:
1. Molecular weights of the XNPR-epoxy adducts (GPC analysis conditions)
    Solvent: THF
    Flow: 1.0 ml
    Run Time Chromeleon: 40 min
    Run Time Omnisec: 29 min
    Gurad Column Plgel 5 µl Guard 50*7.5 mm
    Column: 2*Plgel Mixed D 300*7.5 mm
    Column Oven 27° C.
    Detector 1: Shodex RI-72
    Detector 2: Viscotek Dual 270
    Injection Volume: 100 µl
    Sample Conc.: 4-5 mg/ml up to 3000; 3 mg/ml 3000-50000, about 1 mg>50000
    Calculation Omisec Absolute MW acc. Viscotek
2. Strength Test Substrate Description
    Strength tests are performed on substrates with a combination of hot dipped zinc coated (DX56D+Z100MB 0.75 mm thick) and electro-galvanized zinc coated steel (DC05B+ZE 75/75 0.75 mm thick).
3. Lap Shear Strength
    Lap shear strength tests are performed following DIN EN 1465: 10×25 mm adhesive bonding area; adhesive layer thickness 0.2 mm
4. Impact Peel Strength
    Impact peel strength tests are performed using ISO 11343: 20×30 mm bonding area; adhesive layer thickness 0.2 mm
5. Viscosity Tests
    a) Casson Viscosity Coefficient and Yield Stress are measured on a Bohlin rheometer CS-50 at 45° C.: cone-plate, 20 mm plate diameter, 4° angle. Shear rate ramp up and down from 0.1 to 20 s−1. Viscosity coefficient and yield stress are calculated using the Casson model.
    b) For purposes of comparison, some viscosity tests are also performed using the same testing method disclosed in EP2134799B1. Specifically, a Bohlin rheometer CS-50 is used. Oscillation is performed at 0.01% deformation and 5 Hz at 25° C. over 200 s.
6. Measurement of Glass Transition Temperature (Tg)
    Same method disclosed in EP2134799B1 is used.
7. Meander Test
    The test method disclosed in EP2134799B1 for analyzing meander formation is used. Specifically, 0.3 g of the adhesive composition is applied at 50° C. on a hot dipped zinc coated steel panel to form an adhesive layer. A piece of rubber of thickness 0.2 mm is placed in each corner to simulate rebound. An identical panel is placed on top of the applied adhesive composition layer and is pressed by hand. Subsequently, this assembly is cured in a convection oven at 175° C. for 25 min. The cured assembly is then broken by means of a wedge and the fracture is assessed qualitatively. A scale of 0 to 100% is used in the observation of meander formation from this test with 100% suggesting no meander formation and 0% suggesting large scale unacceptable meander formation.

Raw Material Components Used in the Samples:

Table 1 illustrates the sources (suppliers) of raw materials used in making the samples of present invention and comparative samples known in the art.

TABLE 1

| Raw materials | Available from | Technical information and functions |
| --- | --- | --- |
| Albipox ® 8001 | Evonik | XNBR-CTBN LER (liquid epoxy resin adduct) of about 10 wt % total elastomeric rubber content and an estimated ratio of XNBR:CTBN of about 7:1. |
| Struktol ® 3604 | Schill&Seilacher | CTBN-LER adduct: 40:60; reference rubber in comparative examples |
| Struktol ® 3691 | Schill&Seilacher | About 5 wt % elastomeric XNBR liquid DGEBA adduct |
| Struktol ® 3693 | Schill&Seilacher | About 5 wt % elastomeric XNBR liquid DGEBF adduct |
| Struktol ® 3695 | Schill&Seilacher | About 10 wt % elastomeric XNBR and CTBN (about 1:1 ratio) liquid DGEBA adduct |
| D.E.R. ™ 671 | Dow Chemical | Solid Bisphenol A DGEBA epoxy resin |
| D.E.R. ™ 331 | Dow Chemical | Liquid Bisphenol A DGEBA epoxy resin |
| Blocked PU toughener* | Dow Chemical | Blocked/capped polyurethane toughener |
| Amicure ® CG 1200G | Air Products | Epoxy hardener: dicyandiamide |

TABLE 1-continued

| Raw materials | Available from | Technical information and functions |
|---|---|---|
| Curing accelerator** | Dow Chemical | tris-2,4,6-(dimethylaminomethyl)-phenol embedded into a novolac polymer matrix |
| Aerosil ® R202 | Evonik | Fumed silica |

*The blocked PU toughener is a secondary-amine blocked PU toughener, disclosed as Formula I in US 20060276601 with the following procedure: 79.29 wt % dried polytetrahydrofuran or polytetra methylene ether glycol, 0.54 wt % dried trimethylolpropane, 13.29 wt % 1,6-hexamethylendiisocyanate are mixed at 85° C. to homogeneity. 0.08 wt % Snapcure ™ 3030 (available from Johnson Matthey) is added and the mixture is allowed to react at 85° C. for 1 hour under nitrogen atmospheres. After one hour of reaction, 6.8 wt % diisopropylamine is added to the mixture and the mixture is stirred for additional 60 min under nitrogen atmosphere. The mixture is then degassed for 20 min under vacuum. Reaction proceeds until the isocyanate content ("the NCO content") is 0.0 wt % measured by Fourier transmission infrared spectroscopy (FTIR).
**The curing accelerator is prepared using the method disclosed in Example 1 of WO 2012006001 A2.

Preparation of Samples

Tables 2 and 3 show two sets (high and low viscosity respectively) of adhesive composition samples prepared using the present invention and some comparative samples. In Table 3, only liquid epoxy resin is used. In both tables, Samples A to F are prepared as embodiments of the present invention. Samples G and H are comparative samples. The units for each component in the adhesive composition samples are in wt %.

Equipment: Planetary Laboratory Mixer Labmax P1 (Molteni)

The rubber component, the epoxy resin blend (samples A1 to H1), D.E.R.™ 331 (samples A1 to H1, respectively A2 to H2), the blocked PU toughener, the wetting agent and the colorant are combined and mixed vigorously for 5 minutes at 50° C. (50 rpm) followed by 20 minutes (150 rpm) under vacuum at the same temperature.

The fillers like Aerosil® 202 are then added followed by mixing for 5 minutes (50 rpm) while cooling to room temperature, and thereafter mixing for another 20 minutes (150 rpm) under vacuum.

Amicure® CG 1200G and the curing accelerator are then added followed by mixing for 3 minutes at a mixing speed of 50 rpm and then 15 minutes at 150 rpm under reduced atmospheric conditions.

TABLE 2

| Raw materials | A1 | B1 | C1 | D1 | E1 | F1 | G1 | H1 |
|---|---|---|---|---|---|---|---|---|
| Albipox ® 8001 | 8.02 | 4.00 | 11.99 | | | | | |
| Struktol ® 3604 | | | | | | | 8.02 | |
| Struktol ® 3691 | | | | 8.02 | | | | |
| Struktol ® 3693 | | | | | 8.02 | | | |
| Struktol ® 3695 | | | | | | 8.02 | | |
| Liguid-solid DGEBA epoxy resin blend* | 46.14 | 50.16 | 42.17 | 46.14 | 46.14 | 46.14 | 46.14 | 54.16 |
| D.E.R. ™ 331 | 7.45 | 7.45 | 7.44 | 7.45 | 7.45 | 7.45 | 7.45 | 7.45 |
| Blocked PU toughener | 14.03 | 14.03 | 14.03 | 14.03 | 14.03 | 14.03 | 14.03 | 14.03 |
| wetting agent | 0.7 | 0.7 | 0.7 | 0.7 | 0.7 | 0.7 | 0.7 | 0.7 |
| colorant | 0.39 | 0.39 | 0.39 | 0.39 | 0.39 | 0.39 | 0.39 | 0.39 |
| Amicure ® CG 1200 G | 4.43 | 4.43 | 4.53 | 4.43 | 4.43 | 4.43 | 4.43 | 4.43 |
| Curing accelerator | 0.84 | 0.84 | 0.84 | 0.84 | 0.84 | 0.84 | 0.84 | 0.84 |
| Aerosil ® R202 | 7.68 | 7.68 | 7.68 | 7.68 | 7.68 | 7.68 | 7.68 | 7.68 |
| Filler package** | 10.32 | 10.32 | 10.32 | 10.32 | 10.32 | 10.32 | 10.32 | 10.32 |

*The liquid-solid DGEBA epoxy resin mix is a combination of liquid and solid DGEBA resin like D.E.R. 331 and D.E.R. 671 with a weight ratio of 70:30.
**The filler package is a combination of magnesium silicate, calcium oxide and calcium carbonate in a weight ratio of about 0.06:0.53:1.

TABLE 3

| Raw materials | A2 | B2 | C2 | D2 | E2 | F2 | G2 | H2 |
|---|---|---|---|---|---|---|---|---|
| Albipox ® 8001 | 8.02 | 4.00 | 11.99 | | | | | |
| Struktol ® 3604 | | | | | | | 8.02 | |
| Struktol ® 3691 | | | | 8.02 | | | | |
| Struktol ® 3693 | | | | | 8.02 | | | |
| Struktol ® 3695 | | | | | | 8.02 | | |
| D.E.R. ™ 331 | 53.59 | 57.61 | 49.62 | 53.59 | 53.59 | 53.59 | 53.59 | 61.61 |
| Blocked PU toughener | 14.03 | 14.03 | 14.02 | 14.03 | 14.03 | 14.03 | 14.03 | 14.03 |
| A typical wetting agent | 0.70 | 0.70 | 0.70 | 0.70 | 0.70 | 0.70 | 0.70 | 0.70 |
| A typical colorant | 0.39 | 0.39 | 0.39 | 0.39 | 0.39 | 0.39 | 0.39 | 0.39 |
| Amicure ® CG 1200 G | 4.43 | 4.43 | 4.53 | 4.43 | 4.43 | 4.43 | 4.43 | 4.43 |
| Curing Accelerator | 0.84 | 0.84 | 0.84 | 0.84 | 0.84 | 0.84 | 0.84 | 0.84 |

TABLE 3-continued

| Raw materials | A2 | B2 | C2 | D2 | E2 | F2 | G2 | H2 |
|---|---|---|---|---|---|---|---|---|
| Aerosil ® R202 | 7.68 | 7.68 | 7.68 | 7.68 | 7.68 | 7.68 | 7.68 | 7.68 |
| Filler package | 10.32 | 10.32 | 10.32 | 10.32 | 10.32 | 10.32 | 10.32 | 10.32 |

Testing of Raw Materials and Samples

The molecular weight and polymer dispersibility index of various XNBR-epoxy adducts are measured and summarized in Table 4.

TABLE 4

| | Mn (Da) | Mw (Da) | polymer dispersibility index | Mono-Ologomeric content [wt. %] (DGBPA-resins) |
|---|---|---|---|---|
| Struktol ® 3604 | 6800 | 12000 | 1.8 | 58.8 |
| Struktol ® 3614 | 6400 | 12400 | 1.9 | 57.6 |
| Struktol ® 3691 | 45500 | 122600 | 2.7 | 94.9 |
| Struktol ® 3693 | 40600 | 120300 | 3.0 | 94.7 |
| Struktol ® 3695 | 4200 | 78900 | 18.8 | 90.5 |
| Albipox ® 8001 | 11200 | 85400 | 7.7 | 89.9 |

It is noted that all molecular weights of the tested rubber-epoxy adducts (for example, Albipox® 8001 or Struktols® 3691, 3693 and 3695) are above 60,000 Da in Mw. The adducts in the comparative samples such as Struktol® 3604 or 3614, based on CTBN rubber (such as HYCAR X8 or X13 available from Emerald) have significantly lower Mw (below 13,000). The lower Mn value for the Struktol® 3695 reflects in an inferior performance as described below. In embodiments of the present invention, the adducts with a Mn value above 10,000 Da are preferred. Similarly, a Mw value of above 60,000 Da is preferred with a more preferred value of above 80,000 Da.

In preferred embodiments, the XNBR-modified epoxy adducts have a high viscosity at 25° C. of above 50,000 mPa·s, preferably above 300,000 mPa·s, and more preferably above 500,000 mPa·s.

Table 5 shows the mechanical performance of the samples prepared under the present invention and of the comparative samples. It is demonstrated that the addition of XNBR-epoxy adducts into the adhesive composition will not compromise the mechanical characteristics of the adhesive compositions. In other words, with or without the added XNBR-epoxy adducts, the adhesive compositions will have similar or comparable mechanical characteristics as shown in Table 5. It is also noted that higher glass transition temperatures are observed for samples of present invention over those of the comparative samples using conventional rubber-epoxy adducts. The lower viscous samples of the present invention prepared in accordance with Table 3 show the highest TGs in general.

TABLE 5

| Formulation | Casson Viscosity Coefficient [Pas] | Yield Stress [Pa] | Tg [° C.] | Lap Shear Strength [MPa] | Impact Peel Strength [N/mm] |
|---|---|---|---|---|---|
| A1 | 67 | 467 | 106 | 19.9 | 30.7 |
| B1 | 36 | 467 | 106 | 19.6 | 33.8 |
| C1 | 33 | 443 | 107 | 19.8 | 31.4 |
| D1 | 29 | 489 | 103 | 19.7 | 30.4 |
| E1 | 26 | 469 | 101 | 19.9 | 32.6 |
| F1 | 30 | 421 | 99 | 19.8 | 32.3 |
| A2 | 10 | 525 | 119 | 19.4 | 27.9 |
| B2 | 9 | 558 | 122 | 19.2 | 27.5 |
| C2 | 11 | 511 | 122 | 19.7 | 26.1 |
| D2 | 10 | 480 | 115 | 19.6 | 28.7 |
| E2 | 9 | 499 | 114 | 19.9 | 29.6 |
| F2 | 10 | 397 | 115 | 19.9 | 28.9 |
| G1 | 40 | 543 | 100 | 20 | 32.5 |
| G2 | 11 | 521 | 114 | 19.1 | 28.7 |
| H1 | 46 | 407 | 100 | 19.9 | 30.5 |
| H2 | 7 | 596 | 121 | 19.0 | 25.8 |

Table 6 shows the viscosity test results (method of EP2134799B1) of adhesive formulations described in Tables 2 and 3 used in the present invention and comparative samples using the testing method disclosed in EP2134799B1.

TABLE 6

| | Viscosity [Pas] |
|---|---|
| A1 | 1350 |
| B1 | 1130 |
| C1 | 1310 |
| D1 | 1090 |
| E1 | 1160 |
| F1 | 1010 |
| A2 | 648 |
| B2 | 590 |
| C2 | 462 |
| D2 | 489 |
| E2 | 307 |
| F2 | 323 |
| G1 | 1120 |
| G2 | 579 |
| H1 | 1470 |
| H2 | 706 |

Tables 7 and 8 summarize the observations of meander formation test on various samples of the present invention (higher and lower viscosity compositions, respectively), the comparative samples and a product of prior art currently available in the market. It is demonstrated that the higher the molecular weight of the rubber-epoxy adducts used in the adhesive composition of the present invention, the better the result, that is, the less meander formation after hemming and curing.

TABLE 7

| Sample | Meander-free observations in % |
|---|---|
| A1 | 90 |
| B1 | 80 |
| C1 | 100 |
| D1 | 100 |
| E1 | 80 |
| F1 | 50 |
| G1 | 10 |

TABLE 7-continued

| Sample | Meander-free observations in % |
|---|---|
| H1 | 30 |
| SikaPower™ 492 | 10 |

SikaPower™ 492, a commercially available formulation available from Sika AG, is used here for comparison purposes.

TABLE 8

| Sample | Meander-free observations in % |
|---|---|
| A2 | 90 |
| B2 | 90 |
| C2 | 100 |
| D2 | 70 |
| E2 | 80 |
| F2 | 20 |
| G2 | 40 |
| H2 | 30 |

All above test results indicate that when higher wt % amount of XNBR-epoxy adducts are added to the crash durable adhesive compositions, a better meander formation results can be achieved. However, when the content of XNBR-epoxy adducts is too high, for example higher than 15 wt % of the adhesive composition, drawbacks of the composition may occur, for example, threading and pump transferability, etc. The present invention provides such an ideal adhesive composition with proper types and amounts of rubber-epoxy adducts so that meander formation can be significantly reduced or avoided while not compromising the mechanical characteristics of the adhesive compositions.

The invention claimed is:

1. An adhesive composition comprising
   a) an epoxy resin that includes a liquid diglycidyl ether of bisphenol A;
   b) a blocked polyurethane toughener;
   c) a curing agent that includes dicyandiamide; and
   d) a rubber-epoxy adduct component with a Mw value above 60,000 Da, the adhesive composition having a viscosity value—from 307 to 1350 Pa·s at 25° C.

2. An adhesive composition consisting essentially of
   a) at least one liquid diglycidyl ether of bisphenol A and optionally at least one solid diglycidyl ether of bisphenol A;
   b) a blocked polyurethane toughener;
   c) a curing agent that includes dicyandiamide;
   d) a rubber-epoxy adduct component with a Mw value above 60,000 Da;
   e) and optionally one or more of a filler, a wetting agent, a colorant and an adhesion promoter, the adhesive composition having a viscosity value—from 307 to 1350 Pa·s at 25° C.

3. The adhesive composition according to claim 2, wherein the rubber-epoxy component comprises carboxylated acrylonitrile butadiene rubber-epoxy adducts.

4. The adhesive composition according to claim 2 wherein the epoxy resin further includes a solid diglycidyl ether of bisphenol A.

5. The adhesive composition according to claim 2 wherein the rubber-epoxy adduct component has about 1 to 15 wt % of rubber elastomer.

6. The adhesive composition according to claim 2 wherein the rubber-epoxy adduct component has about 3 to 10 wt % of rubber elastomer.

7. The adhesive composition according to claim 2, wherein the rubber-epoxy adduct component has a molecular weight of Mw above 80,000 and Mn above 10,000.

8. The adhesive composition according to claim 2 wherein the rubber elastomer is a combination of at least two different carboxylated nitrile butadiene rubbers.

9. The adhesive composition according to claim 2 wherein the composition comprises at least about 4 wt % of the rubber-epoxy adduct component.

10. The adhesive composition according to claim 2 wherein the composition comprises at least about 8 wt % of the rubber-epoxy adduct component.

11. The adhesive composition according to claim 2 wherein the composition comprises at least about 12 wt % of the rubber-epoxy adduct component.

12. The adhesive composition according to claim 2 wherein the rubber-epoxy adduct component has a viscosity above 50,000 mPa·s at 25° C.

13. The adhesive composition according to claim 2 wherein the rubber-epoxy adduct component has a viscosity above 300,000 mPa·s at 25° C.

* * * * *